United States Patent
Lee

(10) Patent No.: US 9,507,707 B2
(45) Date of Patent: Nov. 29, 2016

(54) NONVOLATILE MEMORY DEVICE AND DATA STORAGE DEVICE INCLUDING THE SAME

(71) Applicant: SK hynix Inc., Gyeonggi-do (KR)

(72) Inventor: Hak Dae Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 336 days.

(21) Appl. No.: 14/200,349

(22) Filed: Mar. 7, 2014

(65) Prior Publication Data

US 2015/0178192 A1    Jun. 25, 2015

(30) Foreign Application Priority Data

Dec. 19, 2013 (KR) ........................ 10-2013-0158913

(51) Int. Cl.
G06F 12/00 (2006.01)
G06F 12/02 (2006.01)

(52) U.S. Cl.
CPC ... G06F 12/0246 (2013.01); *G06F 2212/7208* (2013.01)

(58) Field of Classification Search
None
See application file for complete search history.

(56) References Cited

U.S. PATENT DOCUMENTS

| 2002/0078292 A1* | 6/2002 | Chilton | G06F 12/0866 710/305 |
| 2011/0119419 A1* | 5/2011 | Chapelle | G06F 13/4068 710/110 |

FOREIGN PATENT DOCUMENTS

KR    1020100089020    8/2010

* cited by examiner

*Primary Examiner* — Baboucarr Faal
(74) *Attorney, Agent, or Firm* — IP & T Group LLP

(57) ABSTRACT

A data storage device including a first nonvolatile memory device having a first state information transmission block, a second nonvolatile memory device having a second state information transmission block, which shares a state information line with the first state information transmission block, and a controller having a state information reception block which is suitable for transmitting a control signal for controlling the first state information transmission block and the second state information transmission block to transmit a state information frame, and sequentially receiving a first state information frame transmitted from the first state information transmission block and a second state information frame transmitted from the second state information transmission block, through the state information line.

18 Claims, 9 Drawing Sheets

S1 = Logic "0" : Default Value
S1 = Logic "1" : State Information Transmission Start
S2 = Logic "0" : State Information Not Changed
S2 = Logic "1" : State Information Changed
STIF : State Information Of Nonvolatile Memory Device
ERD : Error Detection Information for State Information
E = Logic "0" : Default Value
E = Logic "1" : State Information Transmission End

NONVOLATILE MEMORY DEVICE AND DATA STORAGE DEVICE INCLUDING THE SAME

CROSS-REFERENCES TO RELATED APPLICATION

The present application claims priority under 35 U.S.C. §119(a) to Korean application number 10-2013-0158913, filed on Dec. 19, 2013, in the Korean Intellectual Property Office, which is incorporated herein by reference in its entirety.

BACKGROUND

1. Technical Field

Various embodiments relate to a data storage device, and more particularly, to a data storage device having a nonvolatile memory device as a storage medium.

2. Related Art

Recently, the paradigm for the computing environment has been converted into ubiquitous computing so that computer systems can be used anytime and anywhere. Due to this fact, the use of portable electronic devices such as mobile phones, digital cameras, and notebook computers has rapidly increased. In general, such portable electronic devices use a data storage device having a memory device. The data storage device serves as a main memory device or an auxiliary memory device of a portable electronic device.

A data storage device having a memory device provides advantages in that there are no mechanical moving parts, and thus stability and durability are excellent, information access speed is high and power consumption is small. The data storage devices having such advantages include a universal serial bus (USB) memory device, a memory card having various interfaces, and a solid state drive (SSD).

SUMMARY

A data storage device capable of efficiently transmitting which state information of a nonvolatile memory device is in will be described herein.

In an embodiment of the present disclosure, a data storage device may include a first nonvolatile memory device including a first state information transmission block, a second nonvolatile memory device including a second state information transmission block, which shares a state information line with the first state information transmission block, and a controller including a state information reception block which is suitable for transmitting a control signal for controlling the first state information transmission block and the second state information transmission block to transmit a state information frame, and sequentially receiving a first state information frame transmitted from the first state information transmission block and a second state information frame transmitted from the second state information transmission block, through the state information line.

In an embodiment of the present disclosure, a nonvolatile memory device may include a memory cell array, a control logic suitable for controlling an operation such that data is stored in the memory cell array or data is read from the memory cell array, and a state information transmission block suitable for generating a state information frame based on a state information provided by the control logic, and transmitting the state information frame through a state information line to an exterior device.

In an embodiment of the present disclosure, a data storage apparatus may include a single state information line, a plurality of memory devices respectively coupled to the single state information line and suitable for transmitting state information thereof through the single state information line, and a controller suitable for receiving the state information of each of the plurality of memory devices through the single state information line, wherein each of the plurality of memory devices transmits the state information thereof through the single state information line according to a serial data communication scheme based on identification information and a number of transmissions of all the state information of the plurality of memory devices.

In an embodiment of the present disclosure, a memory device may include control logic suitable for controlling storage and readout of a memory cell array, and a state information transmission block suitable for generating state information representing the operation state of the memory device, and transmitting the state information externally through a single state information line according to a serial data communication scheme based on identification information and the number of transmissions of the state information of all memory devices sharing the single state information line.

According to the embodiments of the present disclosure, the state information of a nonvolatile memory device may be efficiently transmitted.

BRIEF DESCRIPTION OF THE DRAWINGS

Features, aspects, and embodiments are described in conjunction with the attached drawings, in which.

DETAILED DESCRIPTION

Figure 1:
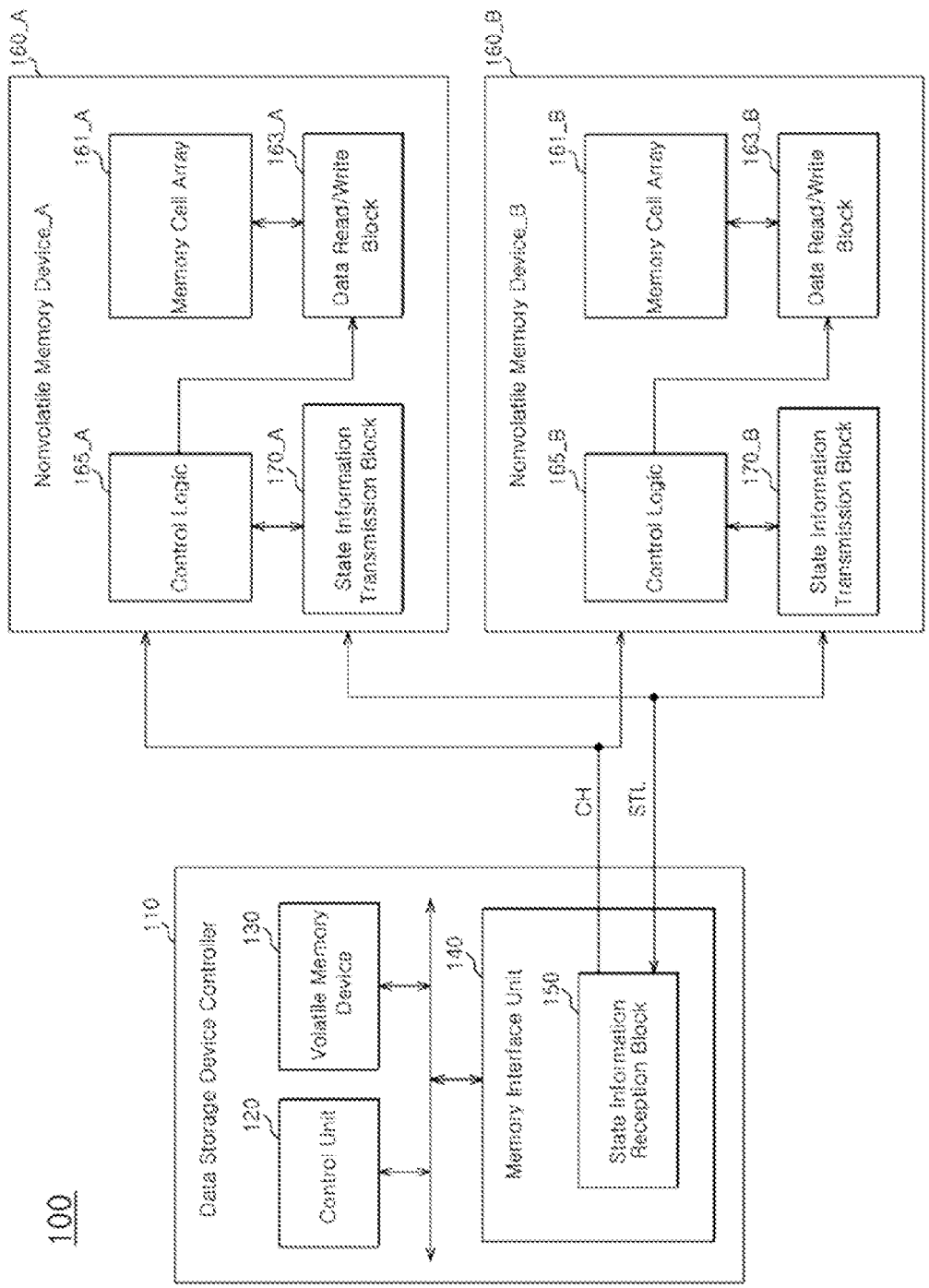
FIG. 1 is a block diagram exemplarily showing a data storage device in accordance with an embodiment of the present disclosure.

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a nonvolatile memory device and a data storage device including the same according to the present disclosure will be described below with reference to the accompanying drawings through exemplary embodiments.

FIG. 1 is a block diagram exemplarily showing a data storage device 100 in accordance with an embodiment of the present disclosure. FIG. 1 shows the data storage device 100 electrically coupled with a host device (not shown) such as a mobile phone, an MP3 player, a digital camera, a computer, a game player, a TV or an in-vehicle infotainment system.

The data storage device 100 may operate in response to a request from the host device. The data storage device 100 may store data to be accessed by the host device. The data storage device 100 may also be referred to as a memory system.

The data storage device 100 may comprise any one various kinds of storage devices according to the protocol of a host interface electrically coupled with the host device. For example, the data storage device 100 may comprise any one of various kinds of storage devices such as a solid state drive (SSD), a multimedia card in the form of a multimedia card (MMC), an embedded MMC (eMMC), a reduced size MMC (RS-MMC) and a micro-MMC, a secure digital (SD) card, a mini-SD card and a micro-SD card, a universal serial bus (USB) storage device, a universal flash storage (UFS) device, a Personal Computer Memory Card International Association (PCMCIA) card, a compact flash (CF) card, a smart media card, a memory stick, and so forth.

The data storage device 100 may comprise any one of various kinds of package types such as a package-on-package (POP), a system-in-package (SIP), a system-on-chip (SOC), a multi-chip package (MCP), a chip-on-board (COB), a wafer-level fabricated package (WFP), a wafer-level stack package (WSP), and so forth.

The data storage device 100 may include a controller 110 and nonvolatile memory devices 160_A and 160_B. Even though FIG. 1 shows the data storage device 100 including two nonvolatile memory devices 160_A and 160_B, it is obvious that the data storage device 100 may include two or more nonvolatile memory devices.

The controller 110 may include a control unit 120, a volatile memory device 130, and a memory interface unit 140. The memory interface unit 140 may include a state information reception block 150.

The control unit 120 may control the general operations of the data storage device 100 through driving of firmware or software, which may be loaded on the volatile memory device 130. The control unit 120 may decode or drive a code type instruction or algorithm such as firmware or software. The control unit 120 may comprise processing units such as a micro control unit (MCU) and a central processing unit (CPU).

The volatile memory device 130 may store firmware or software to be driven by the control unit 120, and data necessary to drive the firmware or the software. That is to say, the volatile memory device 130 may operate as a working memory device of the control unit 120. The volatile memory device 130 may temporarily store data to be transmitted from the host device to the nonvolatile memory devices 160_A and 160_B or from the nonvolatile memory devices 160_A and 160_B to the host device. Namely, the volatile memory device 130 may operate as a buffer memory device or a cache memory device.

The memory interface unit 140 may control the nonvolatile memory devices 160_A and 160_B in response to a request from the control unit 120. For example, the memory interface unit 140 may perform an operation to control the nonvolatile memory devices 160_A and 160_B under control of the control unit 120. The memory interface unit 140 may transmit a control signal, a command, and an address to the nonvolatile memory devices 160_A and 160_B through a channel CH including a control signal line, a command line, and an address line according to a control sequence or control timing. The memory interface unit 140 may transmit, data to the nonvolatile memory devices 160_A and 160_B or receive data transmitted from the nonvolatile memory devices 160_A and 160_B through the channel CH, which includes a data line. Also, the memory interface unit 140 may receive state information of each of the nonvolatile memory devices 160_A and 160_B through a state information line STL.

The memory interface unit 140 may include a state information reception block 150. The state information reception block 150 may control the nonvolatile memory devices 160_A and 160_B through the state information line STL for transmission of state information of the nonvolatile memory devices 160_A and 160_B in order for the control unit 120 to acquire the state information of the nonvolatile memory devices 160_A and 160_B. The state information reception block 150 may receive and store the state information, which is sequentially transmitted from the nonvolatile memory devices 160_A and 160_B.

The nonvolatile memory devices 160_A and 160_B may operate as storage media of the data storage device 100. Each of the nonvolatile memory devices 160_A and 160_B may comprise any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (ReRAM) using a transition metal oxide.

Although the data storage device 100 having the nonvolatile memory devices 160_A and 160_B of the same type is exemplified in FIG. 1, the data storage device 100 may comprise a combination of the various types of nonvolatile memory devices described above. Hereinbelow, the nonvolatile memory devices 160_A and 160_B comprising NAND flash memory devices will be exemplified. Since the nonvolatile memory devices 160_A and 160_B include the same configuration and perform the same operations, the common reference numeral 160 without the suffixes A and B will be used to refer to the nonvolatile memory devices 160_A and 160_B.

The nonvolatile memory device 160 may include a memory cell array 161, a data read/write block 163, a control logic 165, and a state information transmission block 170.

The memory cell array 161 may include memory cells according to the kind of the nonvolatile memory device 160.

The data read/write block 163 may operate as a write driver or a sense amplifier according to the operation mode of the nonvolatile memory device 160. For example, the data read/write block 163 may operate as the sense amplifier for reading the data stored in the memory cells of the memory cell array 161 in the read operation of the nonvolatile memory device 160. For another example, the data read/write block 163 may operate as the write driver for storing the data provided from the controller 110 in the memory cells of the memory cell array 161 in the write operation of the nonvolatile memory device 160.

The control logic 165 may control the general operations of the nonvolatile memory device 160. The control logic 165 may control the data read/write block 163 such that data is stored in the memory cell array 161 or data is read out from the memory cell array 161 according to the control signal, the command and the address transmitted through the channel CH.

The state information transmission block 170 may transmit the state information of the nonvolatile memory device 160 through the state information line STL in response to a control signal. As shown in FIG. 1, the nonvolatile memory devices 160_A and 160_B share the state information line STL, and thus the nonvolatile memory devices 160_A and 160_B may sequentially transmit state information of their own. The state information transmission block 170 may transmit the state information according to a transmission ID, which is set by the controller 110. Operations of the state information transmission block 170 will be described later in detail.

The state information line STL may be a single line. In the case where the nonvolatile memory device 160 comprises a NAND flash memory device as assumed above, the state information line STL may be a ready/busy line for transmitting a ready/busy signal. The state information transmission block 170 may transmit the state information through the single state information line STL according to a serial communication scheme. A state information frame transmitted by the state information transmission block 170 and a serial communication scheme for transmitting the state information frame will be described later in detail.

According to an embodiment of the present disclosure, the state information of the respective nonvolatile memory devices 160_A and 160_B may be transmitted through the single state information line STL shared by a plurality of memory devices or the nonvolatile memory devices 160_A and 160_B in the serial communication scheme. Accordingly, the state information line STL for transferring the state information may be simplified. Further, it is not necessary for the controller 110 to perform a control process, for example, transmission of a state information identification command for identifying the state information of the nonvolatile memory devices 160_A and 160_B.

Figure 2:
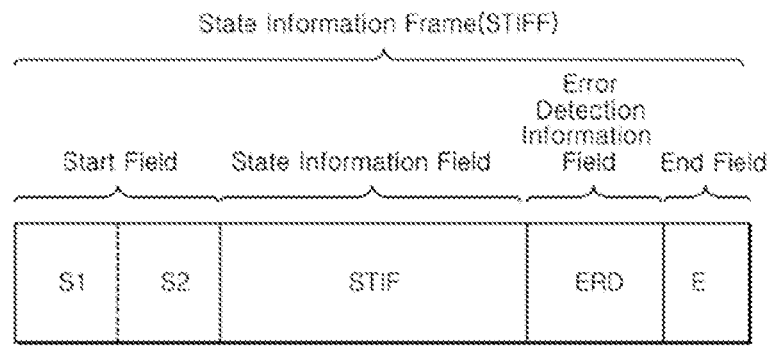
FIG. 2 exemplarily shows a state information frame to be transmitted from a nonvolatile memory device in accordance with an embodiment of the present disclosure.

FIG. 2 exemplarily shows the state information frame to be transmitted from the nonvolatile memory device 160 in accordance with an embodiment of the present disclosure. As described above, state information is transmitted through the state information line STL shared by the nonvolatile memory devices 160_A and 160_B, and thus the state information is transmitted by both the nonvolatile memory device 160_A and the nonvolatile memory device 160_B and should not collide with each other. Moreover, the state information is transmitted according to the serial communication scheme and reliability of the state information should be secured. For this reason, information may be transmitted in addition to the state information of the nonvolatile memory devices 160_A and 160_B.

A data frame including the state information and the additional information may be the unit of transmission. In the present disclosure, the data frame or the unit of transmission is defined as a state information frame STIFF. The state information frame STIFF may be generated by the state information transmission block 170 of the nonvolatile memory device 160. The state information frame STIFF may comprise a start field, a state information field, an error detection information field and an end field.

A first piece of information S1 in the start field may indicate whether transmission of the state information frame STIFF has been started or not and a second piece of information S2 in the start field may indicate whether the state information has been changed or not. For instance, each of the values of the first and second pieces of information S1 and S2 may be logic "0" or logic "1". A default value of the first piece of information S1 may be logic "0". The value of the first piece of information S1 with the logic "1" may represent that transmission of the state information frame STIFF has been started. The value of the second piece of information S2 with the logic "0" may represent that the value of the state information field in the state information frame STIFF is not changed. The value of the second piece of information S2 with the logic "1" may represent that the value of the state information field in the state information frame STIFF is changed.

As shown in FIG. 2, the state information STIF of the nonvolatile memory device 160 in the state information field may be provided by the control logic 165. The state information STIF may represent the operation state of the nonvolatile memory device 160. For example, the state information STIF may represent that the nonvolatile memory device 160 is in a ready state (that is, an operation standby state) or a busy state (that is, an operation progress state). The state information STIF may also represent a kind of performed operation (for example, a read operation, a write operation or an erase operation). Further, the state information STIF may represent whether the performed operation is a pass or a fail.

The error detection information field may be filled with information for securing the reliability of the state information STIF, that is, error detection information ERD necessary for error detection of the state information STIF.

The end field may be filled with information E indicating whether transmission of the state information frame STIFF ends or not. For instance, a value of the information E may be logic "0" or logic "1". The default value of the information E may be the logic "0". The value of the information E with the logic "1" may represent that transmission of the state information frame STIFF has ended.

Figure 3:
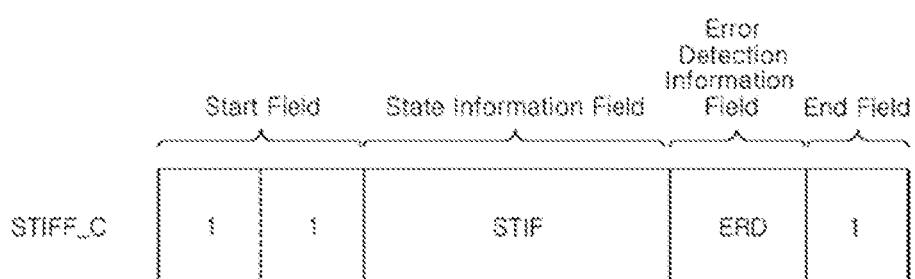
FIG. 3 exemplarily shows state information frames generated according to whether state information of the nonvolatile memory device is changed or not.
Figure 3:
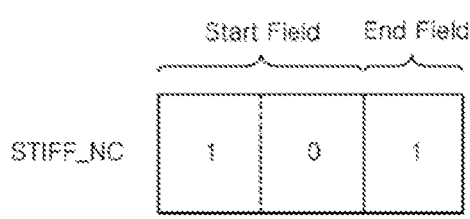

FIG. 3 exemplarily shows state information frames generated according to whether the state information of the nonvolatile memory device 160_A or 160_B is changed or not. In the case where the state information STIF of the state information frame STIFF is not changed, that is, in the case where the state of the nonvolatile memory device 160 is continuously retained, it may not be necessary to transmit the same state information STIF. For this reason, the state information transmission block 170 may differently generate the state information frame STIFF according to whether the state information STIF has been changed or not.

When the state information STIF is changed to be different from the previous state information STIF, the state information transmission block 170 may generate a state information frame STIFF_C which is filled with changed state information STIF. The information S2 of the start field of the state information frame STIFF_C generated in this case may be filled with the logic "1".

Conversely, when the state information STIF is the same as the previous state information STIF, the state information transmission block 170 may generate a state information frame STIFF_NC where the state information STIF and the error detection information ERD are omitted. The information S2 of the start field of the state information frame STIFF_NC in this case may have the value of logic "0". Because the state information STIF and the error detection information ERD are omitted, the size of the state information frame STIFF_NC may be decreased.

Figure 4:
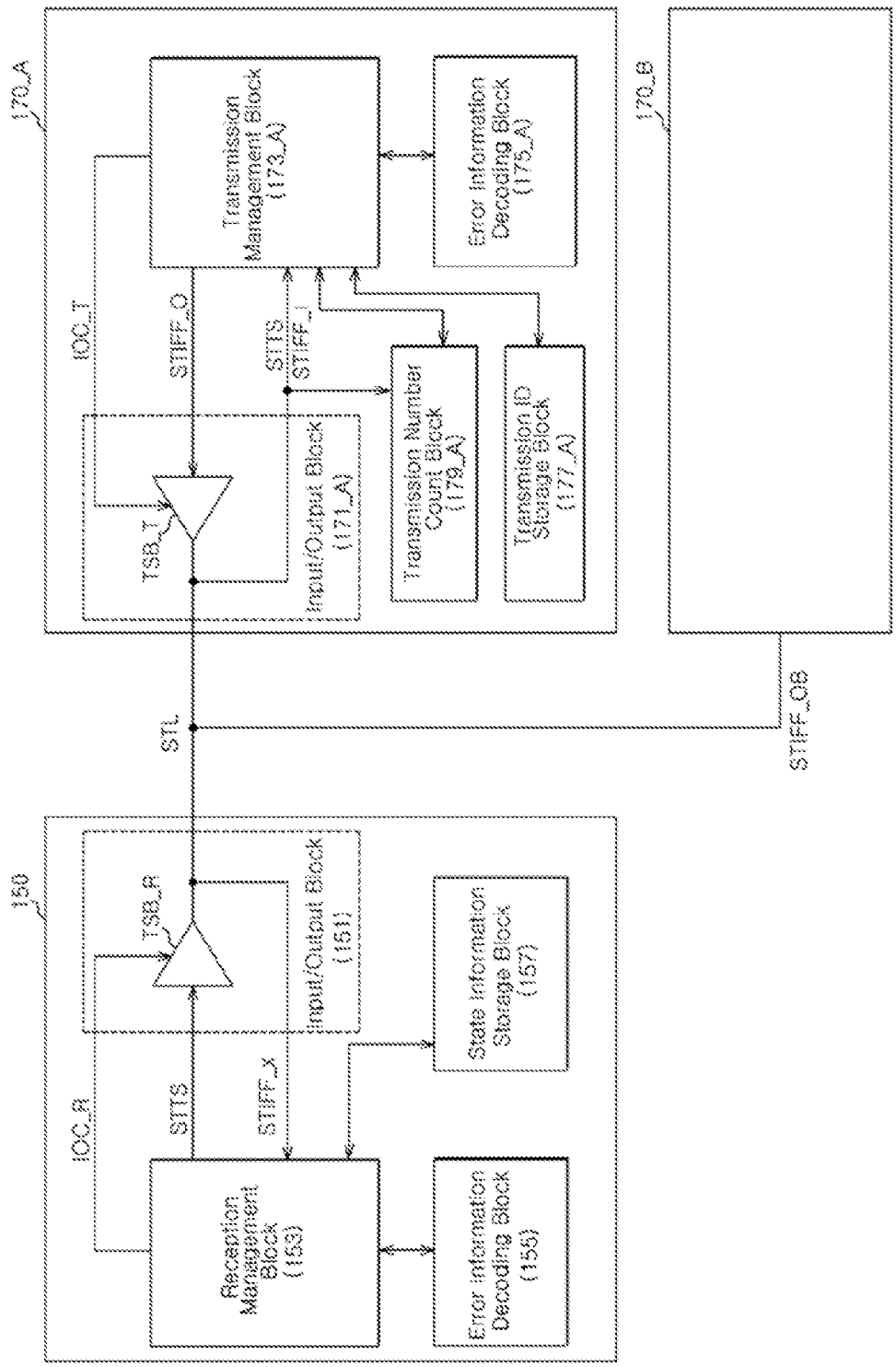
FIG. 4 is a block diagram exemplarily showing a state information reception block and the state information transmission blocks shown in FIG. 1.

FIG. 4 is a block diagram exemplarily showing the state information reception block 150 and the state information transmission blocks 170_A and 170_B shown in FIG. 1.

Since the state information transmission blocks 170_A and 170_B include, the same configuration and perform the same, operations, the common reference numeral 170 without the suffixes A and B will be used to refer to the state information transmission blocks 170_A and 170_B.

The state information reception block 150 may receive the state information of the nonvolatile memory device 160 in response to a request from the control unit 120 and transfer the received state information to the control unit 120. The state information reception block 150 may include an input/output block 151, a reception management block 153, an error information decoding block 155, and a state information storage block 157.

The input/output block 151 may be capable of bidirectional communication through the state information line STL. That is to say, the input/output block 151 may control input/output of signals such that a state information transmission start signal STTS, provided from the reception management block 153, may be transmitted to a transmission management block 173 of the state information transmission block 170 through the state information line STL and a state information frame STIFF_x, provided from the transmission management block 173, may be transmitted to the reception management block 153 through the state information line STL.

The input/output block 151 may include a tri-state buffer TSB_R. The tri-state buffer TSB_R may operate in an open state or a closed state according to an input/output control signal IOC_R provided from the reception management block 153. When operating in the open state, the tri-state buffer TSB_R may transmit the state information transmission start signal STTS, which is provided from the reception management block 153, to the state information line STL. When operating in the closed state, the tri-state buffer TSB_R may become a high impedance state and block the output of the state information transmission start signal STTS to the state information line STL.

The reception management block 153 may provide the state information transmission start signal STTS to the transmission management block 173 such that the transmission management block 173 may start transmission of the state information frame STIFF_x. The error information decoding block 155 may detect an error of the state information STIF included in the state information frame STIFF_x received by the input/output block 151, based on the error detection information ERD included in the received state information frame STIFF_x. When the error information decoding block 155 informs the reception management block 153 of detection of the error, the reception management block 153 may provide again the state information transmission start signal STTS to the transmission management block 173. The reception management block 153 may extract the state information STIF from the received state information frame STIFF_x and may store the extracted state information STIF in the state information storage block 157.

The state information transmission block 170 may transmit a state information frame STIFF_O in response to the state information transmission start signal STTS of the state information reception block 150. The state information transmission block 170 may include an input/output block 171, the transmission management block 173, an error information generation block 175, a transmission ID storage block 177, and a transmission number count block 179.

The input/output block 171 may be capable of bidirectional communication through the state information line STL. That is to say, the input/output block 171 may control the input/output of signals such that the state information frame STIFF_O, provided from the transmission management block 173, may be transmitted to the reception management block 153 through the state information line STL and the state information transmission start signal STTS, provided from the reception management block 153, and a state information frame STIFF_OB, provided from the other state information transmission block 170_B, may be transmitted to the transmission management block 173 through the state information line STL.

The input/output block 171 may include a tri-state buffer TSB_T. The tri-state buffer TSB_T may operate in an open state or a closed state according to an input/output control signal IOC_T provided from the transmission management block 173. When operating in the open state, the tri-state buffer TSB_T may transmit the state information frame STIFF_O, which is provided from the transmission management block 173, to the state information line STL. When operating in the closed state, the tri-state buffer TSB_T may change to a high impedance state and block the output of the state information frame STIFF_O from reaching the state information line STL.

The transmission management block 173 may combine the state information STIF, provided from the control logic 165 with additional information and generate the state information frame STIFF_O. The transmission management block 173 may combine the error detection information ERS of the state information STIF, which is generated by the error information generation block 175, into the state information frame STIFF_O. The transmission management block 173 may combine the second information S2 of the start field into the state information frame STIFF_O according to whether the state information STIF has been changed or not.

The transmission management block 173 may combine the information E of the end field into the state information frame STIFF_O.

The transmission ID storage block 177 may store the transmission ID according to the control of the transmission management block 173. The transmission ID may represent transmission order of the transmission management block 173 to ensure that state information frames transmitted from the plurality of state information transmission blocks 170_A and 170_B through the single state information line STL do not collide with each other. The transmission ID may be set by the control unit 120, and may be provided in the form of a command to each of the nonvolatile memory devices 160_A and 160_B through the channel CH.

The transmission number count block 179 may count and store a number of transmissions. The number of transmissions may represent the number of state information frames STIFF_I transmitted from the plurality of state information transmission blocks 170_A and 170_B through the state information line STL. Because the state information transmission blocks 170_A and 170_B are coupled to each other by sharing the state information line STL, the transmission number count block 179 may count not only the number of transmissions of the state information frame transmitted from the state information transmission block to which it belongs, for example the state information transmission block 170_A, but also the number of transmissions of the state information frame transmitted from the other state information transmission block, for example the state information transmission block 170_B. For example, the transmission number count block 179_A may count the number of transmissions of the state information frame STIFF_O transmitted by the state information transmission block 170_A and may also count the number of transmissions of the state information frame STIFF_OB transmitted by the other state information transmission block 170_B. The transmission number count block 179_A may increase the number of transmissions of the state information frame STIFF_I each time the information E of the end field of the state information frame STIFF_I transmitted through the state information line STL indicates the end of transmission. The transmission number count block 179_A may count the number of transmissions up to the total number of transmission IDs, and may initialize the number of transmissions when the number of transmissions becomes identical to the total number of the transmission IDs. The total number of the transmission IDs may be set by the control unit 120 and may be provided in the form of a command to each of the nonvolatile memory devices 160_A and 160_B through the channel CH.

The transmission management block 173 may determine whether or not to transmit the state information frame STIFF_O, based on the transmission ID and the number of transmissions. For instance, the transmission management block 173 may transmit the state information frame STIFF_O when the following mathematical expression 1 is true, and may stand by transmission of the state information frame STIFF_O when the following mathematical expression 1 is false.

$$\text{Transmission ID}-1=\text{Number of Transmissions} \quad \text{[Mathematical Expression 1]}$$

When the mathematical expression 1 is false, the transmission management block 173 may control the tri-state buffer TSB_T of the input/output block 171 to be in the closed state such that the other transmission management block may transmit the state information frame.

Figure 5:
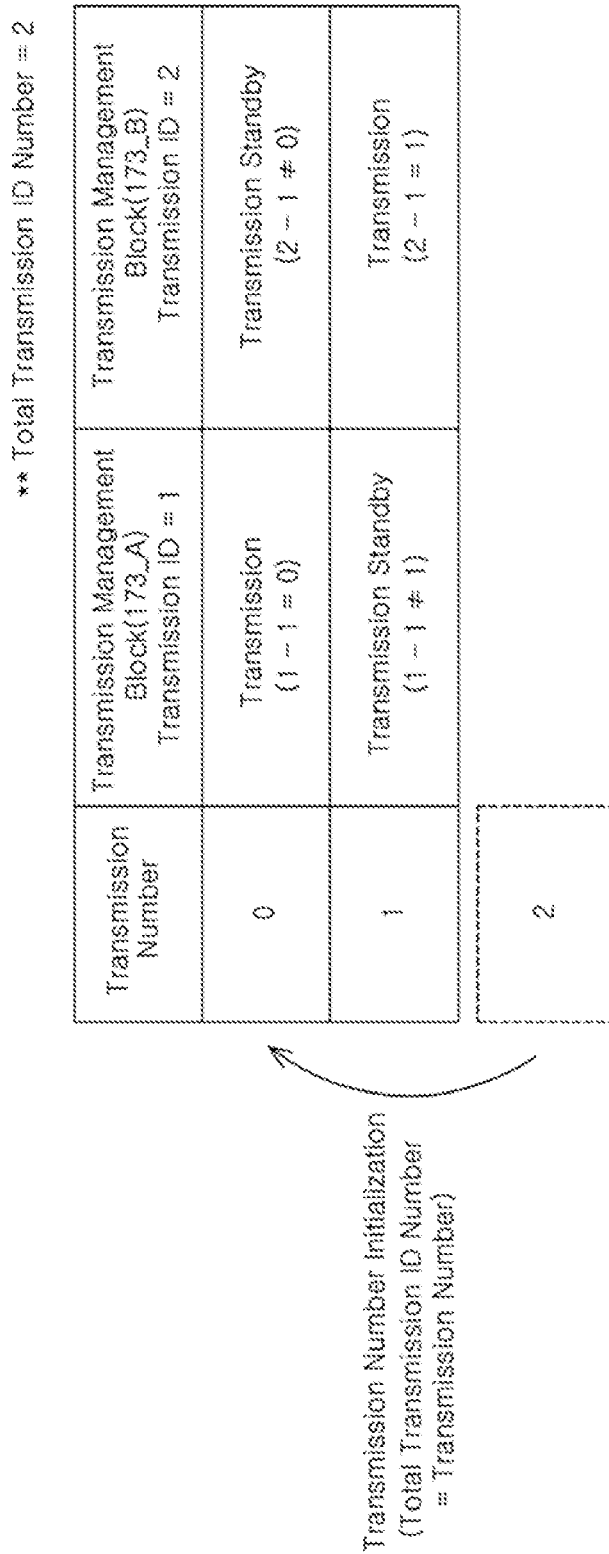
FIG. 5 exemplarily shows a transmission sequence of a state information frame.

FIG. 5 exemplarily shows the transmission sequence of the state information frame STIFF. The transmission sequence of the state information frame STIFF will be described below with reference to FIG. 5.

When transmission of the state information frame STIFF starts in response to the state information transmission start signal STTS, the initial number of transmissions is 0, the transmission ID of the transmission management block 173_A is "1", thus the mathematical expression 1 is currently true to the transmission management block 173_A, and the transmission management block 173_A may transmit the state information frame, and the transmission management block 173_B may stand by transmission of a state information frame. Since the number of transmissions is 1 after the state information frame STIFF is transmitted by the transmission management block 173_A, and thus the mathematical expression 1 is currently true to the transmission management block 173_B, whose transmission ID is "2", the transmission management block 173_B may transmit the state information frame, and the transmission management block 173_A may stand by transmission of the state information frame. Then, since a transmission number becomes identical to the total number of the transmission IDs, for example "2", the number of transmissions may be initialized to be "0". In this way, each of the transmission management blocks 173_A and 173_B of the state information transmission blocks 170_A and 170_B may determine its turn to transmit the state information frame.

Figure 6:
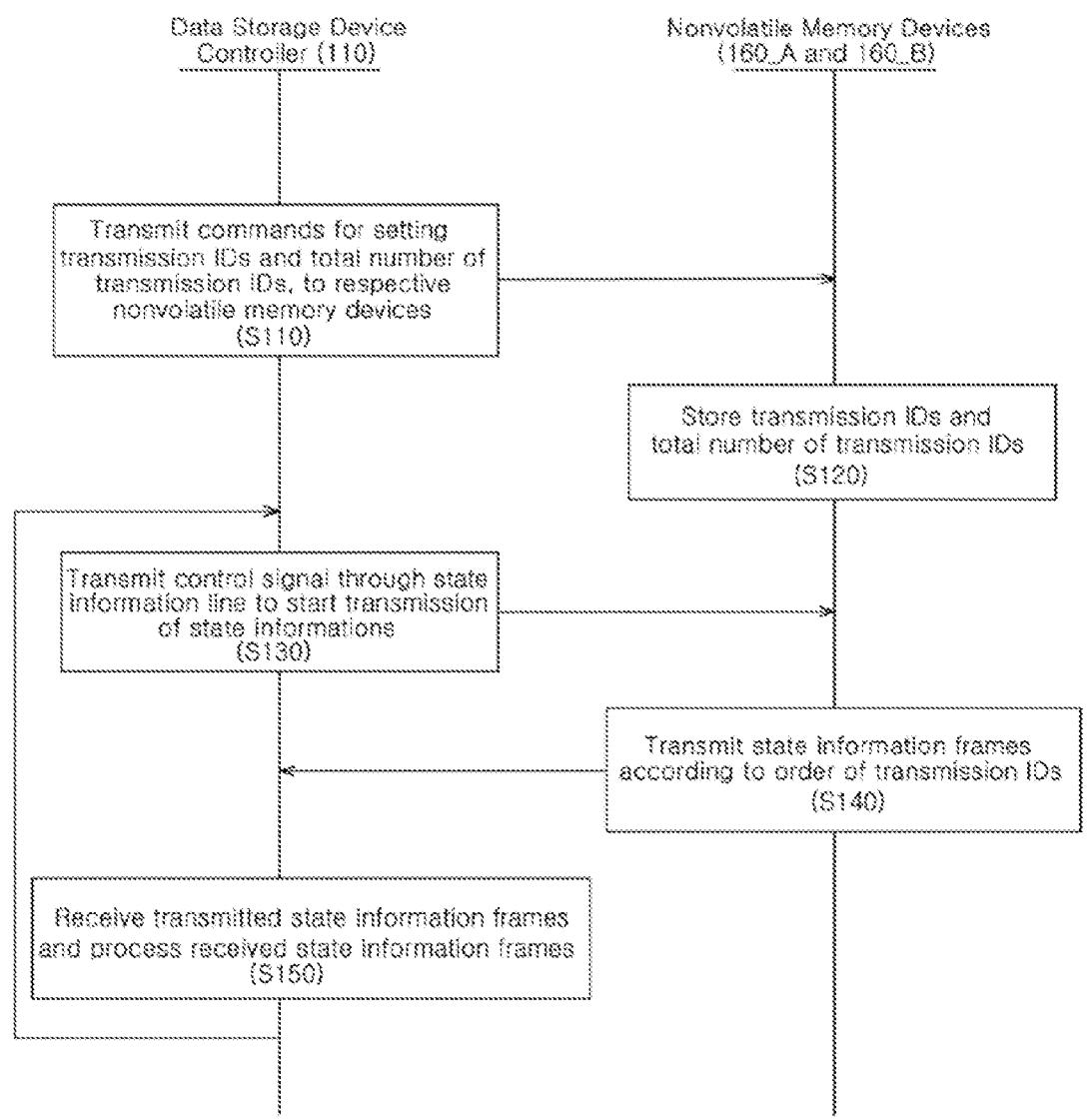
FIG. 6 is a flow chart illustrating interoperations between a data storage device controller and nonvolatile memory devices shown in FIG. 1.

FIG. 6 is a flow chart illustrating interoperations between the data storage device controller 110 and the nonvolatile memory devices 160_A and 160_B shown in FIG. 1. A process of setting circumstances for transmitting the state information frames and a state information frame transmitting process will be described below in detail with reference to FIGS. 1, 4 and 6.

The controller 110 may transmit commands for allocating the transmission IDs and setting the total number of the transmission IDs to the respective nonvolatile memory devices 160_A and 160_B (step S110). The transmission IDs and the total number of the transmission IDs may be set according to the number of nonvolatile memory devices included in the data storage device.

The nonvolatile memory devices 160_A and 160_B may store the allocated transmission IDs and the set total number of the transmission IDs transmitted from the controller 110 (step S120). Because the transmission IDs and the total number of the transmission IDs are transmitted in the form of commands, the transmission IDs and the total number of the transmission IDs may be identified by the control logics 165. The transmission IDs may be stored in the transmission ID storage blocks 177, and the total number of the transmission IDs may be stored in the transmission number count blocks 179.

When the controller 110 needs the state information of the nonvolatile memory devices 160_A and 160_B, the controller 110 may transmit a control signal through the state information line STL such that transmission of the state information may start (S130). In detail, the reception management block 153 may transmit the state information transmission start signal STTS through the state information line STL to the transmission management blocks 173 in response to a request from the control unit 120.

The nonvolatile memory devices 160_A and 160_B may transmit their state information frames according to the order of the transmission IDs (S140). In detail, the transmission management block 173 of each of the nonvolatile memory devices 160_A and 160_B may determine whether the mathematical expression 1 is true or false to itself, based on the transmission IDs and the number of transmissions. The transmission management block 173 may transmit its state information frame when the mathematical expression 1 is true to itself. Conversely, the transmission management block 173 may stand by transmission of its state information frame when the mathematical expression 1 is false to itself so that the state information frame of the other nonvolatile memory device, to which the mathematical expression 1 is true, may be transmitted.

The controller 110 may receive the transmitted state information frames and process the received state information frames (step S150). In detail, the reception management block 153 may extract state information from the transmitted state information frames and store the extracted state information in the state information storage block 157. Also, the reception management block 153 may provide the stored state information to the control unit 120.

When the process of setting circumstances for transmitting state information frames (that is, the step S110 and the step S120) is completed, the state information frame transmitting process (that is, the step S130, the step S140 and the step S150) may be repeatedly performed as the controller 110 demands.

Figure 7:
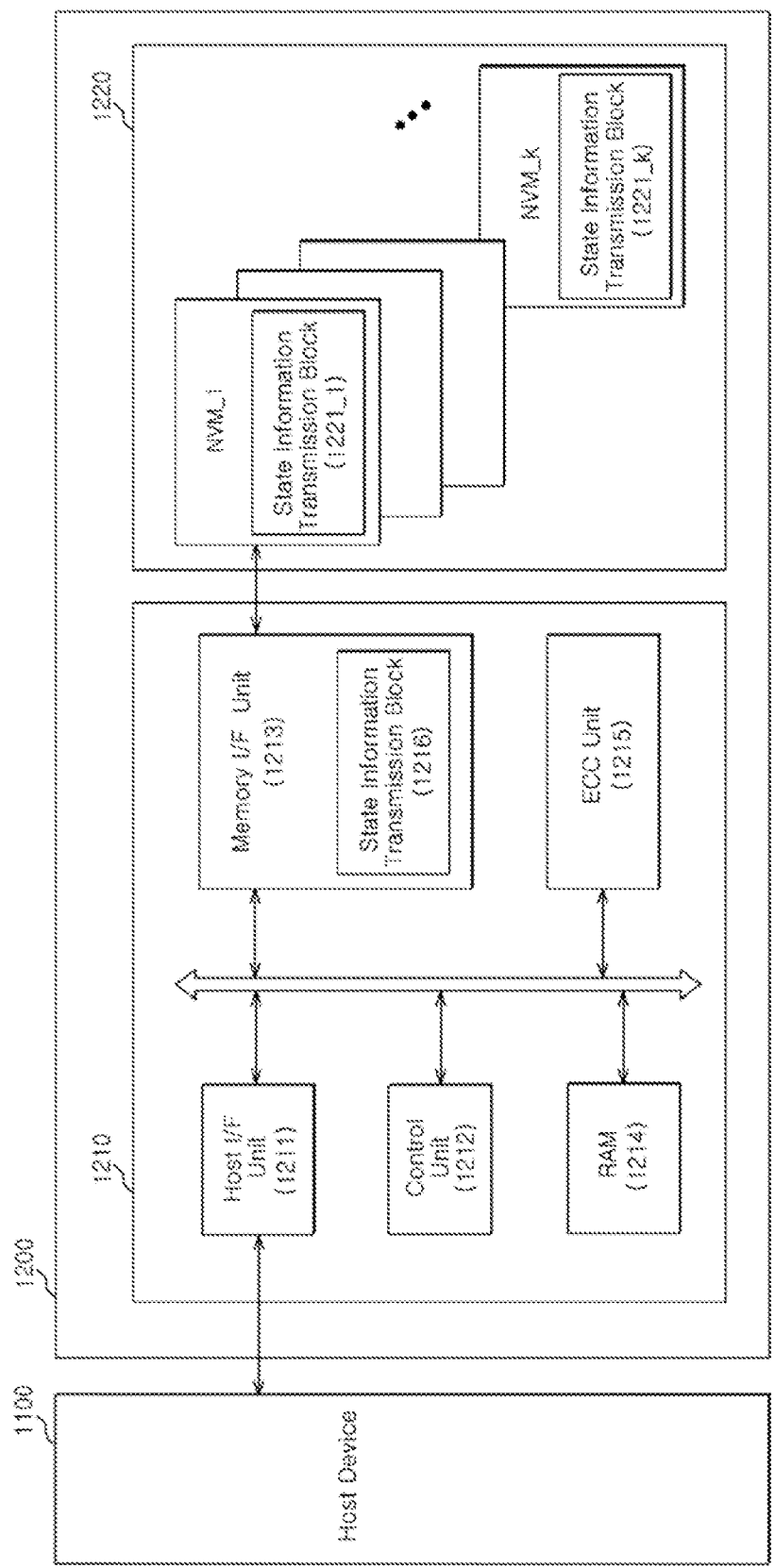
FIG. 7 is a block diagram exemplarily showing a data processing system in accordance with an embodiment of the present disclosure.

FIG. 7 is a block diagram exemplarily showing a data processing system in accordance an embodiment of the present disclosure. Referring to FIG. 7, a data processing system 1000 may include a host device 1100 and a data storage device 1200.

The data storage device 1200 may include a controller 1210, and a nonvolatile memory device 1220. The data storage device 1200 may be used by being electrically coupled to the host device 1100 such as a desktop computer, a notebook computer, a digital camera, a mobile phone, an MP3 player, a game player, an in-vehicle infotainment system, and so forth. The data storage device 1200 is also referred to as a memory system.

The controller 1210 may access the nonvolatile memory device 1220 in response to a request from the host device 1100. For example, the controller 1210 may control the read, program or erase operation of the nonvolatile memory device 1220. The controller 1210 may drive the firmware for controlling the nonvolatile memory device 1220.

The controller 1210 may include well-known component elements such as a host interface unit 1211, a control unit 1212, a memory interface unit 1213, a RAM 1214 and an error correction code (ECC) unit 1215.

The control unit 1212 may control the general operations of the controller 1210 in response to a request from the host device 1100. The RAM 1214 may be used as the working memory of the control unit 1212. The RAM 1214 may temporarily store the data read from the nonvolatile memory device 1220 or the data provided from the host device 1100.

The host interface unit 1211 may interface the host device 1100 and the controller 1210. For example, the host interface unit 1211 may communicate with the host device 1100 through one of various interface protocols such as a universal flash storage (UFS) protocol, a universal serial bus (USB) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, or a serial attached SCSI (SAS) protocol.

The memory interface unit 1213 may interface the controller 1210 and the nonvolatile memory device 1220. The memory interface unit 1213 may provide commands, addresses and control signals to the nonvolatile memory device 1220. Furthermore, the memory interface unit 1213 may exchange data with the nonvolatile memory device 1220.

The memory interface unit 1213 may include a state information reception block 1216. The state information reception block 1216 may transmit a state information transmission start signal through a state information line (not shown) which is electrically coupled with state information transmission blocks 1221_1 to 1221_k, and may receive state information frames as responses to such a signal.

The error correction code unit 1215 may detect an error in the data read from the nonvolatile memory device 1220. Also, the error correction code unit 1215 may correct the detected error when the detected error falls within a correctable range. Meanwhile, the error correction code unit 1215 may be provided inside or outside the controller 1210 according to the memory system 1000.

The nonvolatile memory device 1220 may be used as the storage medium of the data storage device 1200. The nonvolatile memory device 1220 may comprise one or more nonvolatile memory devices NVM_1 to NVM_k according to the storage capacity of the data storage device 1200. The nonvolatile memory devices NVM_1 to NVM_k may respectively include the state information transmission blocks 1221_1 to 1221_k. The respective state information transmission blocks 1221_1 to 1221_k may transmit their state information frames in conformity with a transmission sequence in response to the state information transmission start signal which is received from the state information reception block 1216.

The controller 1210 and the nonvolatile memory device 1220 may be integrated into one semiconductor apparatus and may comprise a memory device. For example, the controller 1210 and the nonvolatile memory device 1220 may be integrated into one semiconductor apparatus and may comprise a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and so forth.

Figure 8:
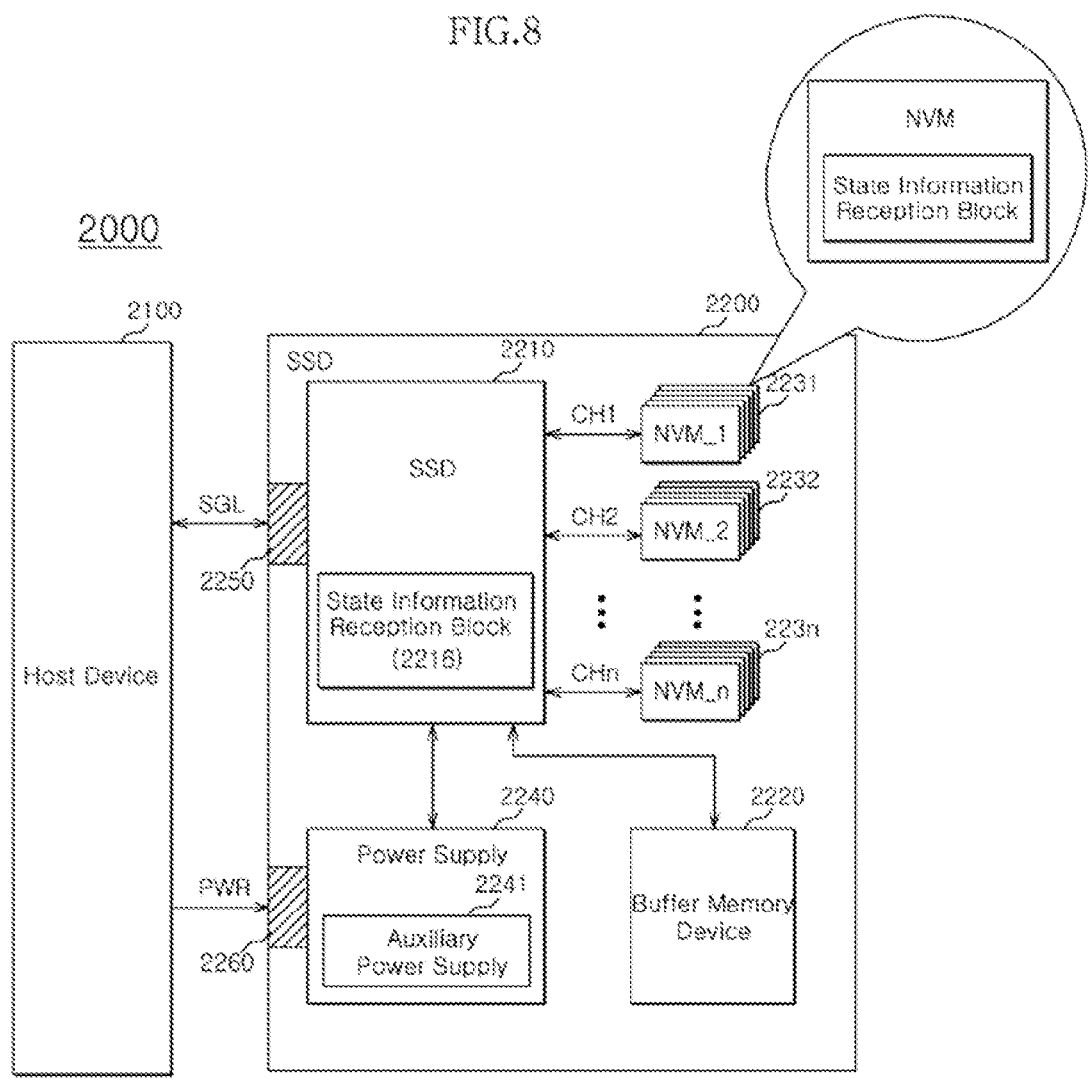
FIG. 8 is a block diagram exemplarily showing a solid state drive (SSD) in accordance with an embodiment of the present disclosure.

FIG. 8 is a block diagram exemplarily showing a solid state drive (SSD) in accordance with an embodiment of the present disclosure. Referring to FIG. 8, a data processing system 2000 may include a host device 2100 and a solid state drive (SSD) 2200.

The SSD 2200 may include an SSD controller 2210, the buffer memory device 2220, nonvolatile memory devices 2231 to 223n, a power supply 2240, a signal connector 2250, and a power connector 2260.

The SSD 2200 may operate in response to a request from the host device 2100. That is to say, the SSD controller 2210 may access the nonvolatile memory devices 2231 to 223n in response to a request from the host device 2100. For example, the SSD controller 2210 may control the read, program and erase operations of the nonvolatile memory devices 2231 to 223n.

The SW controller 2210 may include a state information reception block 1216. The state information reception block 1216 may transmit a state information transmission start signal through a state information line (not shown) which is electrically coupled with state information transmission blocks of the nonvolatile memory devices 2231 to 223n, and may receive state information frames as responses to such a signal.

The buffer memory device 2220 may temporarily store data which is to be stored in the nonvolatile memory devices 2231 to 223n. Further, the buffer memory device 2220 may temporarily store data which is read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be electrically coupled to the SSD controller 2210 through a plurality of channels CH1 to CHn, respectively. One or more nonvolatile memory devices may be electrically coupled to one channel. The nonvolatile memory devices electrically coupled to one channel may be electrically coupled to the same signal bus and data bus.

The nonvolatile memory devices 2231 to 223n may respectively include the state information transmission blocks. The respective state information transmission blocks may transmit their state information frames in conformity with a transmission sequence in response to the state information transmission start signal which is received from the state information reception block 1216.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include super capacitors capable of being charged with power PWR.

The SSD controller 2210 may exchange a signal SGL with the host device 2100 through the signal connector 2250. The signal SGL may include a command, an address, data, and so forth. The signal connector 2250 may by constituted by a connector such as a parallel advanced technology attachment (PATA), serial advanced technology attachment (SATA), small computer system interface (SCSI), serial attached SCSI (SAS), peripheral component interconnection (PCI) and PCI express (PCI-E) protocols, according to the interface scheme between the host device 2100 and the SSD 2200.

Figure 9:
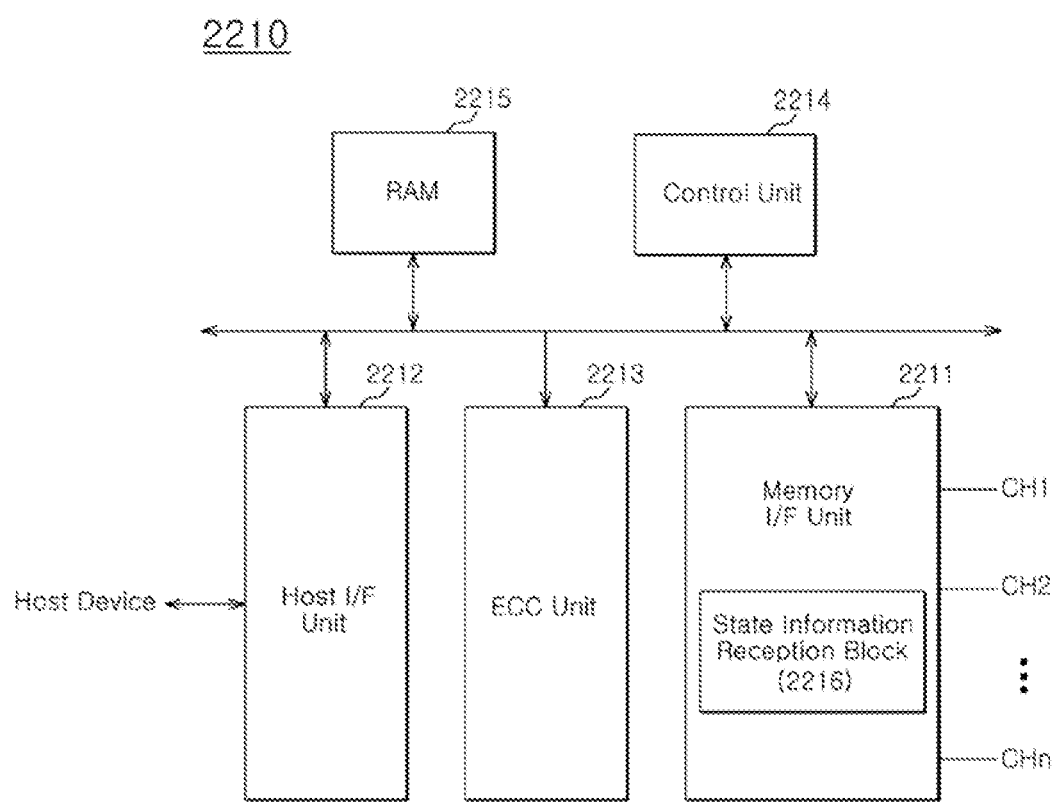
FIG. 9 is a block diagram exemplarily showing the SSD controller shown in FIG. 8.

FIG. 9 is a block diagram exemplarily showing the SSD controller 2210 shown in FIG. 8. Referring to FIG. 9, the SSD controller 2210 includes a memory interface unit 2211, a host interface unit 2212, an error correction code (ECC) unit 2213, a control unit 2214, and a RAM 2215.

The memory interface unit 2211 may provide a command and an address to the nonvolatile memory devices 2231 to 223n. Moreover, the memory interface unit 2211 may exchange data with the nonvolatile memory devices 2231 to 223n. The memory interface unit 2211 may scatter the data transmitted from the buffer memory device 2220 to the respective channels CH1 to CHn, under the control of the control unit 2214. Furthermore, the memory interface unit 2211 may transfer the data read from the nonvolatile memory devices 2231 to 223n to the buffer memory device 2220, under the control of the control unit 2214. The memory interface unit 2211 may include the state information reception block 2216.

The host interface unit 2212 may provide an interface with the SSD 2200 in correspondence to the protocol of the host device 2100. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. In addition, the host inter ace unit 2212 may perform a disk emulating function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored in spare areas of the nonvolatile memory devices 2231 to 223n. The ECC unit 2213 may detect an error of the data read from the nonvolatile memory devices 2231 to 223n. When the detected error falls within a correctable range, the ECC unit 2213 may correct the detected error.

The control unit 2214 may analyze and process a signal SGL inputted from the host device 2100. The control unit 2214 may control the general operations of the SSD controller 2210 in response to a request from the host device 2100. The control unit 2214 may control the operations of the buffer memory device 2220 and the nonvolatile memory devices 2231 to 223n according to a firmware for driving the SSD 2200. The RAM 2215 may be used as a working memory device for driving the firmware.

Figure 10:
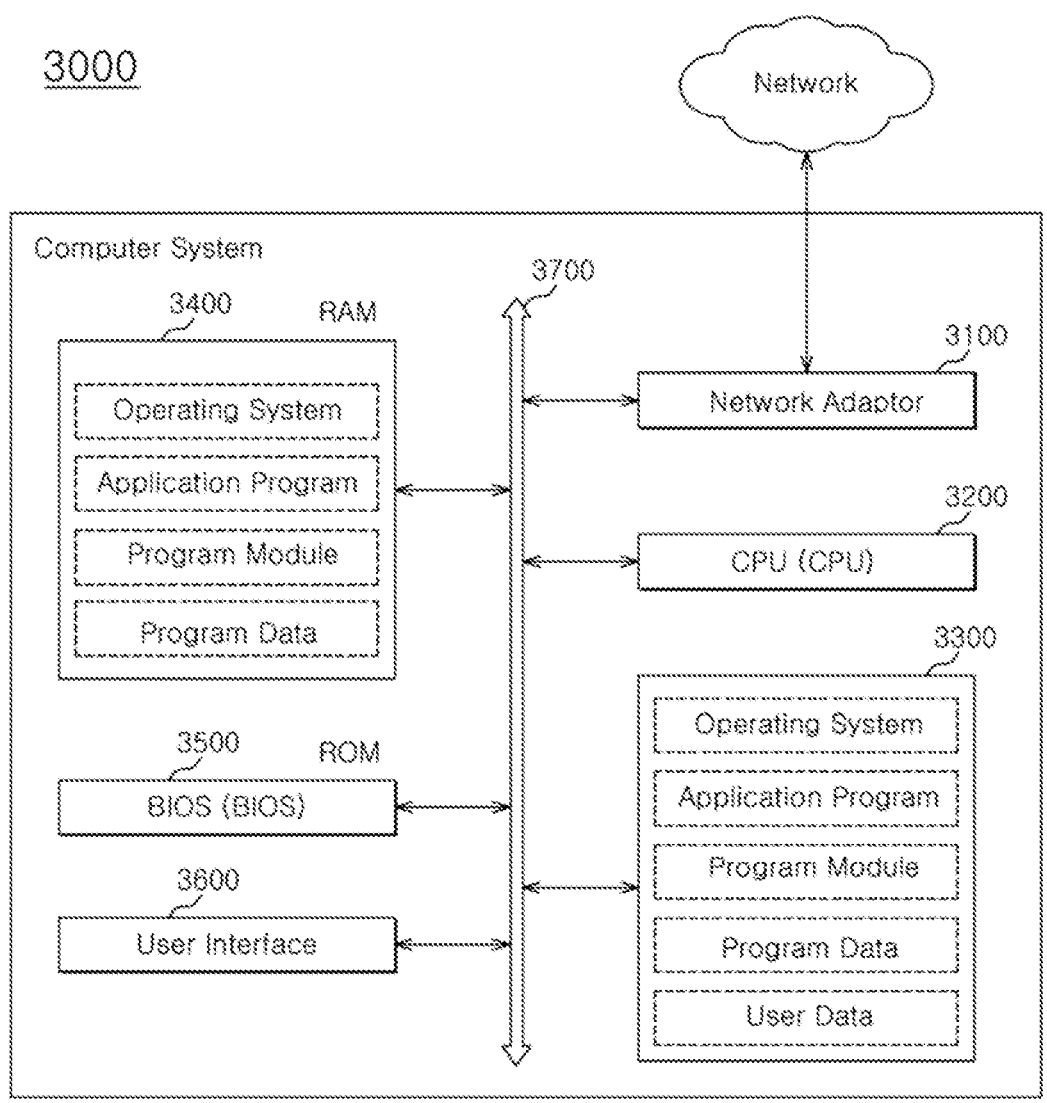
FIG. 10 is a block diagram exemplarily showing a computer system having the data storage device in accordance with an embodiment of the present disclosure.

FIG. 10 is a block diagram exemplarily showing a computer system having the data storage device in accordance with the embodiment of the present disclosure. Referring to FIG. 10, a computer system 3000 includes a network adaptor 3100, a central processing unit 3200, a data storage device 3300, a RAM 3400, a ROM 3500 and a user interface 3600, which are electrically coupled to a system bus 3700. The data storage device 3300 may comprise the data storage device 100 shown in FIG. 1, the data storage device 1200 shown in FIG. 7 or the SSD 2200 shown in FIG. 8.

The network adaptor 3100 provides interfacing between the computer system 3000 and external networks. The central processing unit 3200 performs general operations for driving an operating system residing at the RAM 3400 or an application program.

The data storage device 3300 stores general data necessary in the computer system 3000. For example, an operating system for driving the computer system 3000, an application program, various program modules, program data and user data are stored in the data storage device 3300.

The RAM 3400 may be used as a working memory device of the computer system 3000. Upon booting, the operating system, the application program, the various program modules and the program data necessary for driving programs, which are read from the data storage device 3300, are loaded on the RAM 3400. A BIOS (basic input/output system) which is activated before the operating system is driven is stored in the ROM 3500. Information exchange between the computer system 3000 and a user is implemented through the user interface 3600.

Although not shown in a drawing, it is to be readily understood that the computer system 3000 may further include devices such as an application chipset, a camera image processor, and so forth.

While certain embodiments have been described above, it will be understood to those skilled in the art that the embodiments described are by way of example only. Accordingly, the nonvolatile memory device and the data storage device including the same described herein should not be limited based on the described embodiments. Rather, the nonvolatile memory device and the data storage device including the same described herein should only be limited in light of the claims that follow when taken in conjunction with the above description and accompanying drawings.

What is claimed is:

1. A data storage device comprising:
a first nonvolatile memory device including a first state information transmission block;
a second nonvolatile memory device including a second state information transmission block, which shares a state information line with the first state information transmission block; and
a controller including a state information reception block suitable for transmitting a control signal for controlling the first state information transmission block and the second state information transmission block to transmit a state information frame, and sequentially receiving a first state information frame transmitted from the first state information transmission block and a second state information frame transmitted from the second state information transmission block through the state information line,
wherein the first state information transmission block determines whether to transmit the first state information frame based on a first transmission ID and a number of transmissions of all the state information frames transmitted through the state information line,
wherein the second state information transmission block determines whether to transmit the second state information frame based on a second transmission ID and the number of transmissions, and
wherein the first transmission ID represents a transmission order of the first state information transmission block is set by the controller and the second transmission ID represents a transmission order of the second state information transmission block is set by the controller.

2. The data storage device according to claim 1, wherein the first state information transmission block transmits the first state information frame when the number of transmissions is equal to a value of the first transmission ID minus 1, and stands by transmission of the first state information frame when the number of transmission is different from the value of the first transmission ID minus 1.

3. The data storage device according to claim 1, wherein the second state information transmission block transmits the second state information frame when the number of transmissions is equal to a value of the second transmission ID minus 1, and stands by transmission of the second state information frame when the number of transmissions is different from the value of the second transmission ID minus 1.

4. The data storage device according to claim 1, wherein the first and second state information frames include first and second state information representing operation states of the first and second nonvolatile memory devices, respectively, and
wherein the first state information transmission block generates the first state information frame by adding, to the first state information, error detection information of the first state information, and
wherein the second state information transmission block generates the second state information frame by adding, to the second state information, error detection information of the second state information.

5. The data storage device according to claim 4, wherein the first state information transmission block generates the first state information frame including only transmission start information and transmission end information when the first state information is not changed, and
wherein the second state information transmission block generates the second state information frame including only transmission start information and transmission end information when the second state information is not changed.

6. The data storage device according to claim 1, wherein the state information reception block comprises:
an input/output block suitable for performing a control task to enable bidirectional communication through the state information line;
an error information decoding block suitable for detecting an error of first and second state information of the first and second nonvolatile memory devices included in the first and second state information frames based on error detection information included in the first and second state information frames, respectively;
a reception management block suitable for generating the control signal, and extracting the state information from the received first and second state information frames; and
a state information storage block suitable for storing the extracted state information according to control of the reception management block.

7. The data storage device according to claim 6, wherein the input/output block comprises a tri-state buffer suitable for operating in an open state or a closed state according to control of the reception management block, and
wherein the tri-state buffer transmits the control signal provided from the reception management block to the state information line in the open state, and blocks output of the control signal to the state information line in the closed state.

8. The data storage device according to claim 6, wherein the reception management block regenerates the control signal when it is informed that an error in the first or second state information has been detected by the error information decoding block.

9. A nonvolatile memory device comprising: a memory cell array;
a control logic suitable for controlling an operation such that data is stored in the memory cell array or data is read from the memory cell array; and
a state information transmission block suitable for generating a state information frame based on state information provided by the control logic, and sequentially transmitting the state information frame through a state information line to an exterior device,
wherein the state information transmission block determines whether to transmit the state information frame based on a transmission ID and a number of transmissions of all the state information frames transmitted through the state information line, and
wherein the transmission ID represents a transmission order of the state information transmission block-set by a controller.

10. The nonvolatile memory device according to claim 9, wherein, when a control signal for controlling transmission of the state information frame is transmitted through the state information line from the exterior device, the state information transmission block transmits the state information frame in response to the control signal.

11. The nonvolatile memory device according to claim 9, wherein the state information transmission block generates the state information frame by adding transmission start information, error detection information about the state information, and transmission end information in addition to the state information.

12. The nonvolatile memory device according to claim 11, wherein the state information transmission block generates the state information frame without the state information and the error detection information when the state information is not changed.

13. The nonvolatile memory device according to claim 9, wherein the control logic provides the state information, which indicates that an operation for the memory cell array is in progress, or on standby, and a pass or a fail, to the state information transmission block.

14. The nonvolatile memory device according to claim 9, wherein the state information transmission block comprises:
an input/output block suitable for performing a control task to enable bidirectional communication through the state information line;
an error information generation block suitable for generating error detection information for the state information;
a transmission management block suitable for generating the state information frame based on the state information and the error detection information;
a transmission ID storage block suitable for storing the transmission ID; and
a transmission number count block suitable for counting the number of transmissions of the all state information frames transmitted through the state information line.

15. The nonvolatile memory device according to claim 14, wherein the input/output block comprises a tri-state buffer suitable for operating in an open state or a closed state according to control of the transmission management block, and wherein the tri-state buffer transmits the state information frame provided from the transmission management block to the state information line in the open state, and blocks output of the state information frame to the state information line in the closed state.

16. The nonvolatile memory device according to claim 14, wherein the transmission number count block initializes a number of transmissions when the number of transmissions of the state information frames reaches a total number of transmission IDs.

17. The nonvolatile memory device according to claim 9, wherein the transmission management block transmits the state information frame when the number of transmissions of the state information frames is equal to a value of the transmission ID minus 1.

18. A data storage apparatus comprising:
a single state information line;
a plurality of memory devices respectively coupled to the single state information line and suitable for sequentially transmitting state information thereof through the single state information line; and
a controller suitable for sequentially receiving the state information of each of the plurality of memory devices through the single state information line,
wherein each of the plurality of memory devices transmits the state information thereof through the single state information line according to a serial data communication scheme based on a transmission ID and a number of transmissions of all the state information transmitted through the single state information line, and
wherein the transmission ID represents a transmission order of each of the plurality of memory devices is set by the controller.

* * * * *